United States Patent
Hernandez et al.

(10) Patent No.: US 10,918,168 B2
(45) Date of Patent: Feb. 16, 2021

(54) ELECTRONIC SEATBELT

(71) Applicant: Ford Global Technologies, LLC, Dearborn, MI (US)

(72) Inventors: Alvaro Jimenez Hernandez, Dearborn, MI (US); Oswaldo Perez Barrera, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/576,475

(22) Filed: Sep. 19, 2019

(65) Prior Publication Data

US 2020/0008538 A1 Jan. 9, 2020

Related U.S. Application Data (62) Division of application No. 15/415,406, filed on Jan. 25, 2017, now Pat. No. 10,470,528.

(51) Int. Cl.
*A44B 11/25* (2006.01)
*B60R 22/48* (2006.01)

(52) U.S. Cl.
CPC ...... *A44B 11/2561* (2013.01); *A44B 11/2573* (2013.01); *B60R 22/48* (2013.01); *A44B 11/2511* (2013.01); *B60R 2022/4808* (2013.01)

(58) Field of Classification Search
CPC . A44B 11/2561; A44B 11/2576; B60R 22/48; B60R 2022/4808
See application file for complete search history.

(56) References Cited

U.S. PATENT DOCUMENTS

| | | | |
|---|---|---|---|
| 4,236,141 A | 11/1980 | Terabayashi et al. | |
| 5,435,046 A | 7/1995 | Miyauchi et al. | |
| 5,490,575 A | 2/1996 | Suran et al. | |
| 6,389,661 B1 | 5/2002 | Brown et al. | |
| 7,178,208 B2 | 2/2007 | Bentsen et al. | |
| 7,378,974 B1 | 5/2008 | Bassett et al. | |
| 7,797,803 B2 | 9/2010 | Falb et al. | |
| 8,020,894 B2 | 9/2011 | Marriott | |
| 8,590,935 B1 | 11/2013 | Leedy | |
| 9,266,498 B2 | 2/2016 | Dewey et al. | |
| 9,439,479 B1 * | 9/2016 | Vu ..................... | A44B 11/2576 |

(Continued)

FOREIGN PATENT DOCUMENTS

| | | |
|---|---|---|
| EP | 1263515 A1 | 9/2001 |
| JP | 2010125992 A | 6/2010 |
| WO | 2018105978 A1 | 6/2018 |

OTHER PUBLICATIONS

Search Report from UKIPO dated Jul. 9, 2018 regarding GB1802280.6 (4 pages).

(Continued)

*Primary Examiner* — Robert Sandy
*Assistant Examiner* — Rowland Do
(74) *Attorney, Agent, or Firm* — Frank A. MacKenzie; Bejin Bieneman PLC (57) ABSTRACT

A seatbelt buckle that includes a housing, an attracting member, an attractable element, and a plate adapted to retain a seatbelt clip within the housing. The member, the element, and the plate may be carried by the housing. The buckle is adapted so that when the member is electronically actuated, the element causes the plate to move toward the member and thereby release the clip.

12 Claims, 7 Drawing Sheets

(56) References Cited

U.S. PATENT DOCUMENTS

| | | |
|---|---|---|
| 2005/0150704 A1 | 7/2005 | Tanaka |
| 2005/0236209 A1 | 10/2005 | Chernoff et al. |
| 2006/0080812 A1 | 4/2006 | O'Brien et al. |
| 2007/0265753 A1 | 11/2007 | Cantu |
| 2009/0248254 A1 | 10/2009 | Mino |
| 2010/0250070 A1 | 9/2010 | Soriano Vilalta |
| 2010/0259503 A1 | 10/2010 | Yanase et al. |
| 2015/0054263 A1 | 2/2015 | Renaudin et al. |
| 2017/0015263 A1 | 1/2017 | Makled et al. |
| 2017/0147959 A1 | 5/2017 | Sweeney et al. |
| 2018/0068505 A1 | 3/2018 | Mullett |
| 2018/0126951 A1 | 5/2018 | Ricci |
| 2018/0157271 A1 | 6/2018 | Urano et al. |
| 2019/0250623 A1 | 5/2019 | Kentley-Klay et al. |

OTHER PUBLICATIONS

Seat Belt Lock with Remote dated Oct. 24, 2016 retrieved from URL: http://www.modifry.com/index.php?route=product/product&product_id=65 (2 pages).
Non-Final Office Action dated Oct. 3, 2019 for U.S. Appl. No. 15/415,475 (35 pages).
Final Office Action dated Mar. 17, 2020 re U.S. Appl. No. 15/415,475, filed Jan. 25, 2017.

\* cited by examiner

ELECTRONIC SEATBELT

CROSS-REFERENCE TO RELATED APPLICATIONS

This application claims the benefit of priority to U.S. patent application Ser. No. 15/415,406 filed on Jan. 25, 2017 titled "ELECTRONIC SEATBELT," which is hereby incorporated by reference.

BACKGROUND

Seatbelt mechanisms include a latch and a buckle and are adapted to restrain a vehicle passenger in the event of a vehicle collision. In conventional electronic systems, the mechanism is energized to inhibit the passenger from unfastening the latch from the buckle (e.g., the mechanism is energized to electronically lock the passenger in a vehicle seat). And when, for example, once the mechanism is no longer energized, the passenger can unfasten the latch and remove it from the buckle.

DETAILED DESCRIPTION

Figure 1:
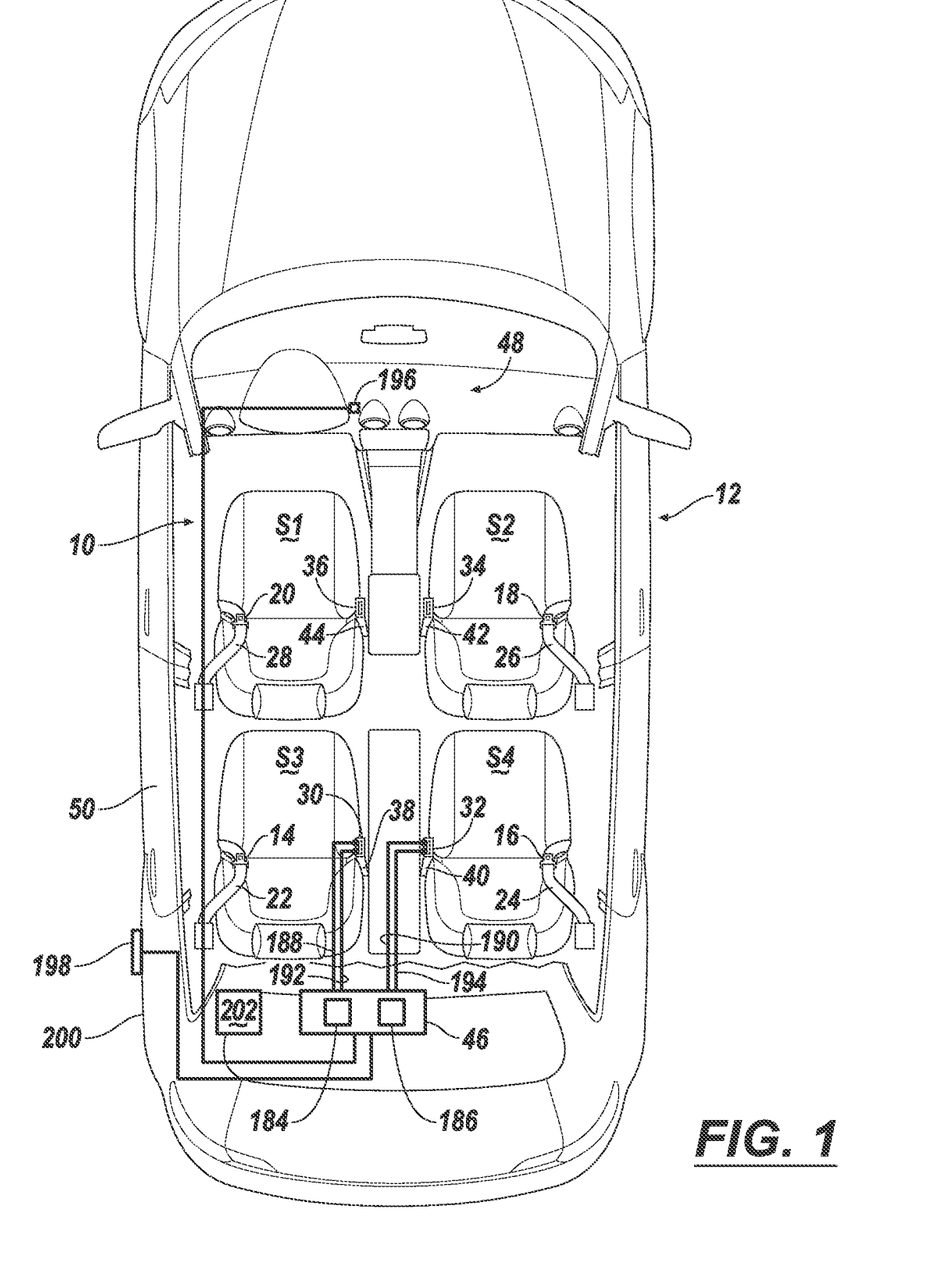
FIG. 1 is a schematic view of an electronic seatbelt system for a vehicle.
Figure 2:
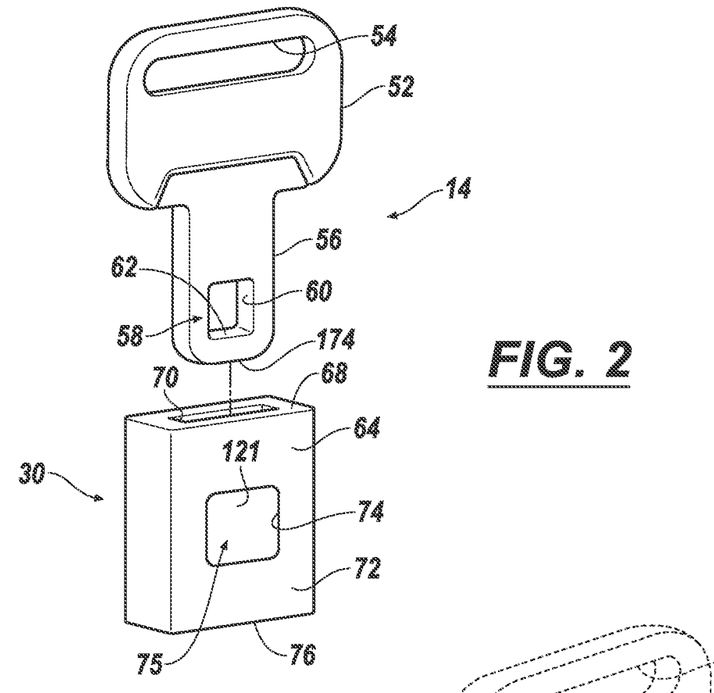
FIG. 2 is a perspective view of a seatbelt clip and a seatbelt buckle in an uncoupled state.
Figure 3:
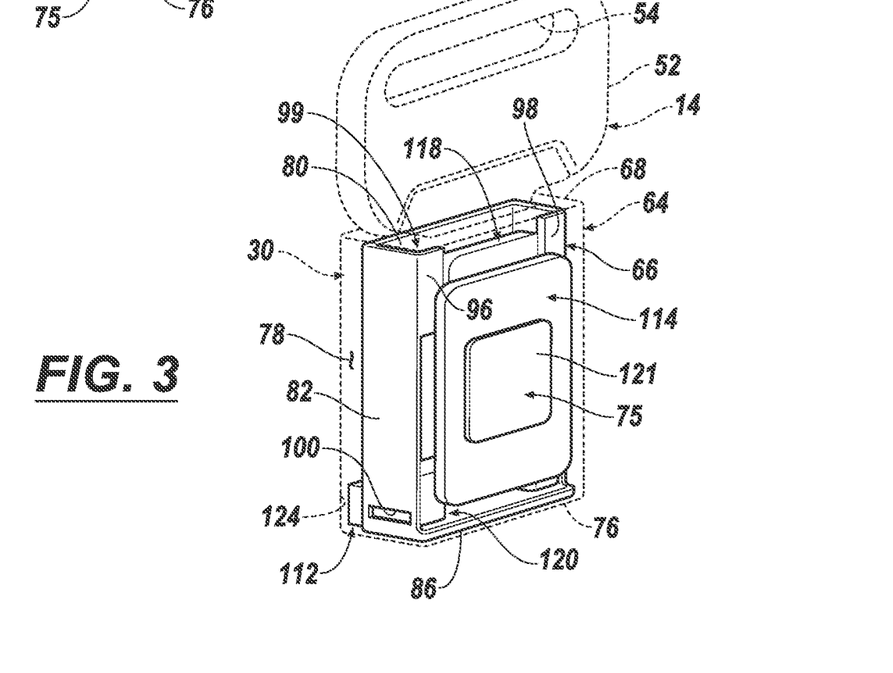
FIG. 3 is a perspective view of the seatbelt clip and seatbelt buckle of FIG. 2 in a coupled state, the clip and a housing of the buckle in phantom.

With reference to the figures, wherein like numerals indicate like parts throughout the several views, an electronic seatbelt system 10 is shown in a vehicle 12. The seatbelt system includes one or more seatbelt clips or latches 14, 16, 18, 20 (each clip coupled to a respective first seatbelt webbing 22, 24, 26, 28), one or more seatbelt buckles 30, 32, 34, 36 (each buckle coupled to a respective second seatbelt webbing 38, 40, 42, 44), and at least one computer 46 (e.g., a restraint control module (RCM)) coupled to at least one of the buckles (e.g., to 30, 32). As discussed herein, while the clip (e.g., 14) and the buckle (e.g., 30) may be mechanically coupled to one another by inserting the clip at least partially into the buckle, the clip may be released from the buckle using an electronic actuation. In at least one example, this feature may inhibit a child from decoupling the clip and buckle from one another until an adult or guardian performs the electronic actuation.

According to one example, the electronic seatbelt system 10 may be suitable for use in autonomous vehicles such as vehicle 12. Consider for example that vehicle 12 is an autonomous taxi that may be used to transport a child to a predetermined destination. The child may be secured in the vehicle 12—e.g., in a child car seat (not shown)—and the car seat may be restrained using clip 14 and buckle 30. Thereafter, the autonomous taxi may transport the child to the predetermined destination. During transport, should the child (or another child in the vehicle) attempt to decouple the clip 14 and buckle 30, they may be unsuccessful as an option to manually decouple the clip 14 and buckle 30 may be unavailable or may be inhibited, as will be described below. For example, in at least one implementation—the buckle 30 may release the clip 14 via an electronic actuation only when the vehicle 12 safely stops at the predetermined destination. Triggering the electronic actuation may be based on one or more criteria—e.g., based on GPS location (as in the child car seat example), based on an instruction sent from a vehicle instrument panel 48 (e.g., by a person seated in a front seat S1 or S2), based on an instruction sent from a mobile device (e.g., such as a Smart phone) (not shown), based on a determination by vehicle computer 46 that vehicle airbags (not shown) have deployed and that the vehicle 12 has stopped, etc. In at least one example, the electronic actuation occurs in response to sensor data (e.g., biometric data) received via a sensor (discussed below) located on the seatbelt buckle (e.g., one of 30-36)—e.g., a fingerprint scan by an authorized user. Examples of the seatbelt system 10 and the electronic actuation will be explained in greater detail below.

In the example above, the autonomous taxi may include the vehicle 12 operating in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

Of course, the electronic seatbelt system 10 may be used in other autonomous modes, as well as non-autonomous modes (i.e., system 10 may be operative in accordance with any of levels 0-4 as well). And for purposes of this disclosure, an autonomous mode is defined as one in which each of vehicle propulsion (e.g., via a powertrain including an internal combustion engine and/or electric motor), braking, and steering are controlled by one or more vehicle computers (e.g., computer 46 and/or other computers not shown).

As shown in the schematic view of FIG. 1, the vehicle 12 may be a passenger car or any other suitable vehicle. For example, vehicle may be a truck, sports utility vehicle (SUV), recreational vehicle, a bus or train (e.g., a school bus), marine vessel, aircraft, or the like that includes the electronic seatbelt system 10. In the illustrated example, four vehicle seats S1, S2, S3, S4 are shown, each having a seatbelt clip 14-20 and a seatbelt buckle 30-36. Each clip 14-20 is coupled to a respective first webbing 22-28, which in turn may be coupled to a body 50 (or vehicle frame (not shown)) of the vehicle 12; similarly, each buckle 30-36 is shown coupled to a respective second webbing 38-44, which in turn may be coupled to the vehicle body or frame. In at least one example, each of the clips 14-20 are identical and each of the buckles 30-36 are identical; therefore, only one clip/buckle pair (e.g., 14, 30) will be described below. And while two rear seatbelt buckles 30, 32 are shown coupled to the computer 46, it should be appreciated that any number of seatbelt buckles could be coupled to the computer (e.g., including one or more of the front seatbelt buckles 34, 36 as well).

FIGS. 2-10 illustrate the clip 14 and buckle 30 in greater detail. The clip 14 includes a base 52 having a slot 54 (for coupling the clip 14 to the first webbing 22) and a tongue 56 coupled to and extending from the base 52. The tongue 56 includes a coupling feature 58—e.g., illustrated here as a through hole and defined by an opening 60 and a thickness of the tongue 56. As will be described more below, the coupling feature 58 may include an abutting surface 62 which may be used to retain the clip 14 within the buckle 30 in a coupled state. Other coupling features also exist; this is merely one example.

Figure 4:
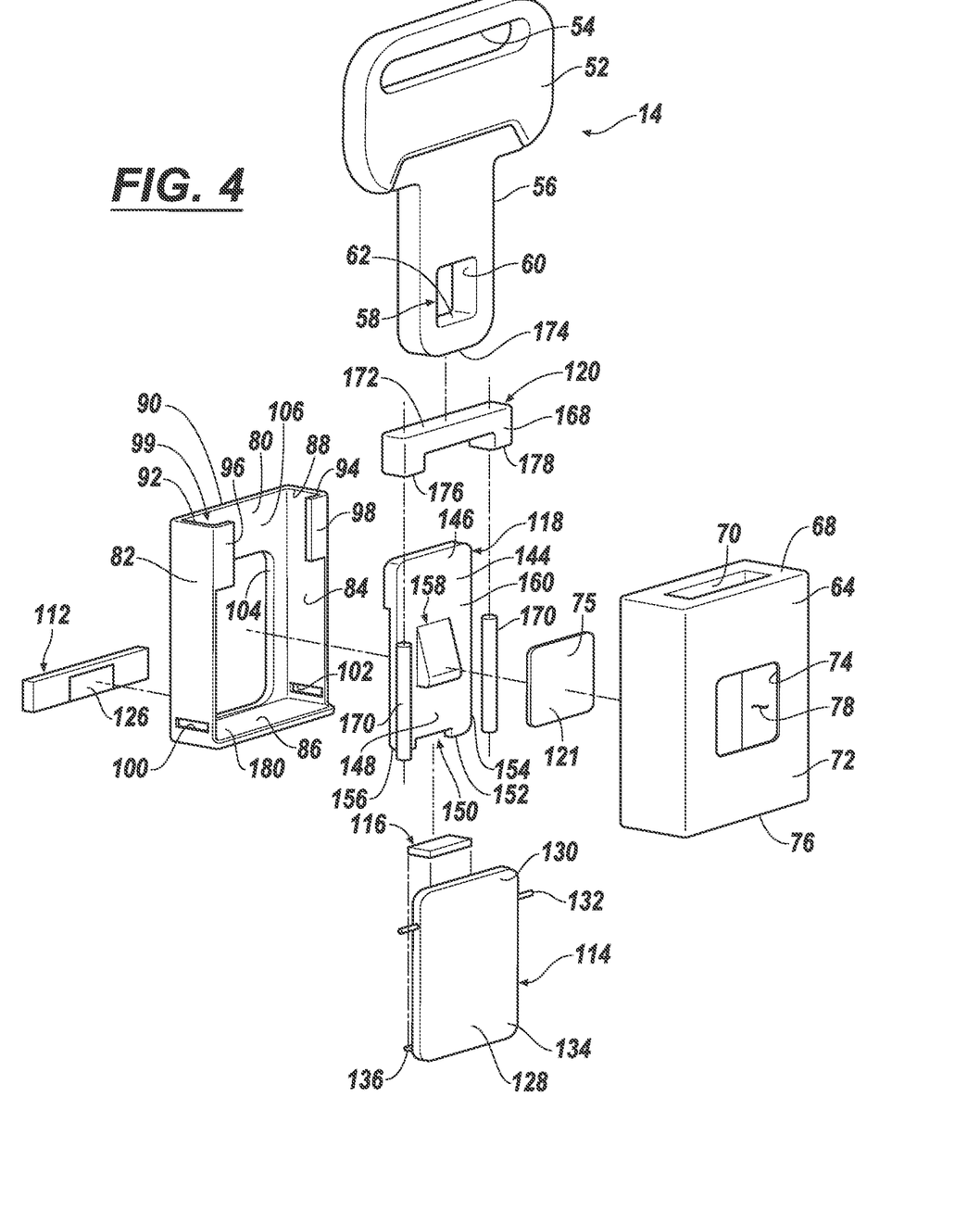
FIG. 4 is an exploded, perspective view of the seatbelt clip and seatbelt buckle of FIG. 2.
Figures 5, 6, 7:
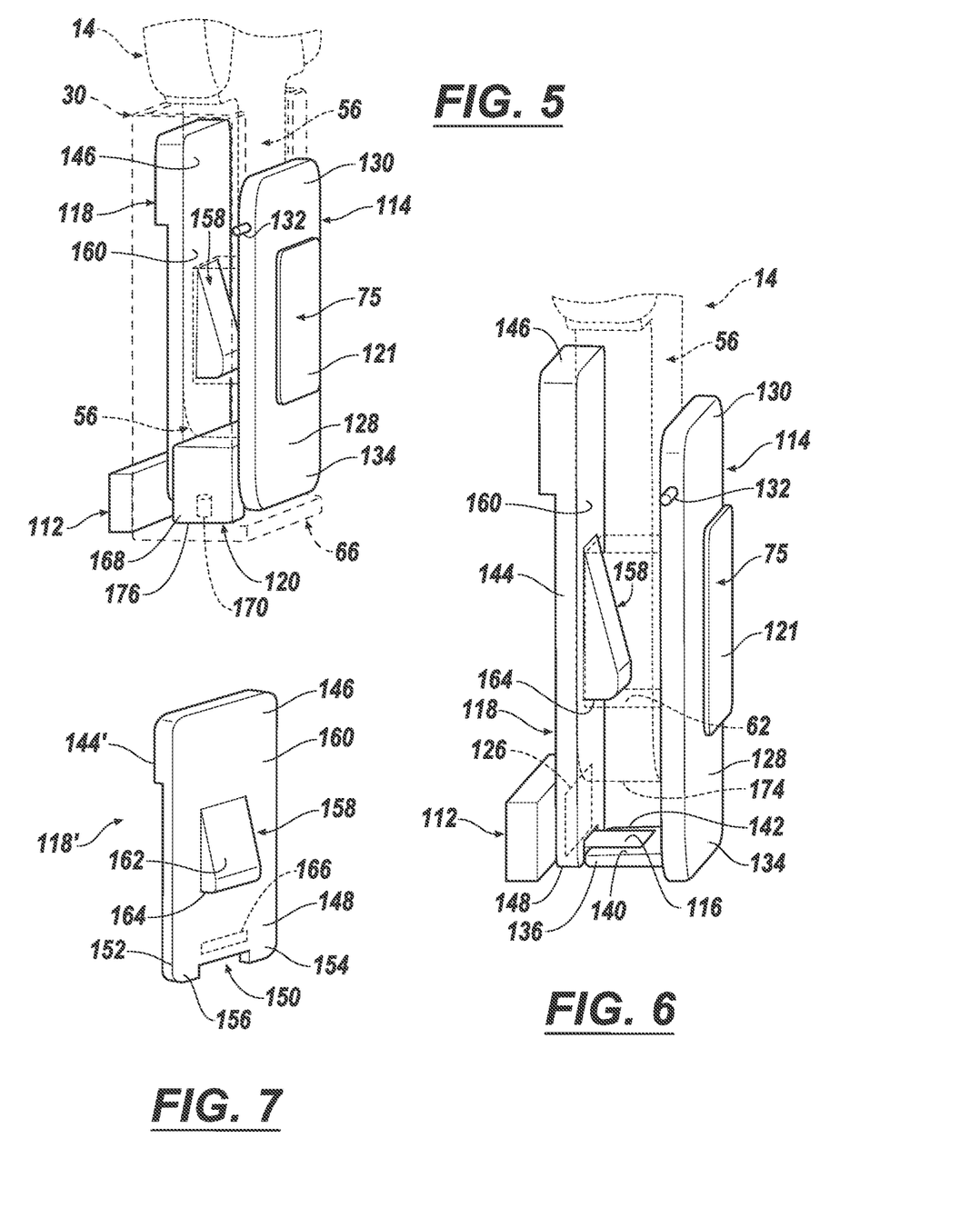
FIG. 5 is a perspective view of the seatbelt clip and seatbelt buckle, wherein the housing of the seatbelt buckle is hidden and a frame of the buckle and the clip are in phantom.
FIG. 6 is a perspective view of the seatbelt buckle, wherein the housing and the frame of the buckle are hidden and the clip is in phantom.
FIG. 7 is a perspective view of an example of a lock of the seatbelt buckle.
Figure 8:
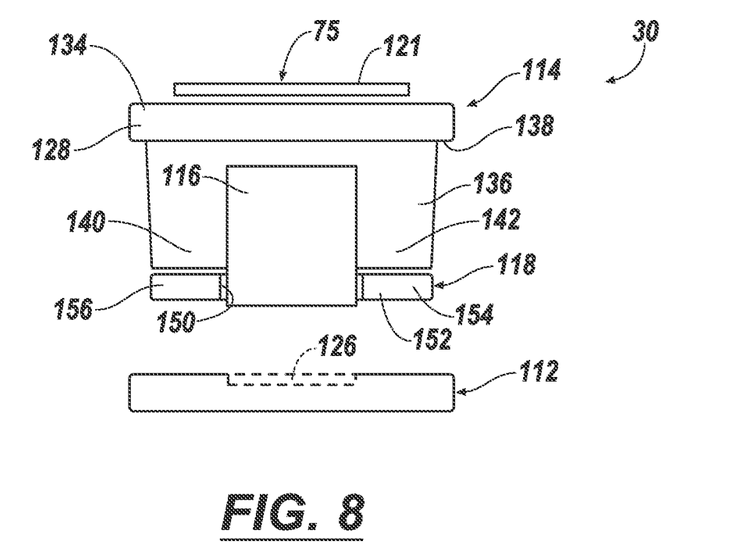
FIG. 8 is an end view of the seatbelt buckle, wherein the housing, frame, and clip are hidden.

The buckle 30 may include a housing 64 and a frame 66 carried within the housing 64. In one non-limiting example (and as illustrated), the housing 64 and frame 66 each may have a rectangular shape. A first end 68 of the housing may have a slotted opening 70 sized to receive the tongue 56 of clip 14. A major side 72 of the housing 64 may have another opening 74 sized to accommodate a sensor 75, as will be described more below. And a second end 76 of the housing 64 (opposite the first end 68), may be open to permit the frame 66 to be slid within an interior 78 thereof. And the frame 66 and/or housing 64 may have retaining features (not shown) to retain the frame 66 within the housing 64 when assembled. This is merely one housing example; others exist (e.g., including examples having an opening for a sensor 75 located on other sides).

The frame 66 may be generally shaped like a drawer having a bottom 80, two extending sides 82, 84 coupled to the bottom 80, and a closed end 86 coupled to the bottom 80 and sides 82, 84. Opposite the closed end 86, the frame 66 may have an opening 88 defined at least partially by an edge 90 of the bottom 80 and the edges 92, 94 of the two extending sides 82, 84. Two flanges 96, 98 may extend toward one another from the respective sides 82, 84—e.g., forming a track 99, the use of which will be described more below. Each extending side 82, 84 may have a corresponding slot (100, 102)—e.g., for coupling a respective second seatbelt webbing 38, as described above. In addition, the bottom 80 may have an opening 104 which may be generally rectangular and which may extend from a middle region 106 of the bottom 80 toward the closed end 86; this opening 104 may permit movement within housing 64 of additional seatbelt buckle components which are described below. The frame 66 and/or the housing 64 each may be formed via a molding process using any suitable non-ferromagnetic material (e.g., high-strength aluminum, plastic, etc.).

The frame 66 may be coupled to the housing 64, and various components described below can be coupled to the frame 66 and/or the housing 64. Further, it should be appreciated that a number of components may be coupled directly to the frame 66 and thus indirectly coupled to the housing 64.

In at least one example, the buckle 30 further may comprise the sensor 75, an attracting member 112, an actuator 114 carrying an attractable element 116, a lock 118 for engaging the tongue 56 of clip 14, and an ejector mechanism 120. Each will be discussed in turn.

Figure 9:
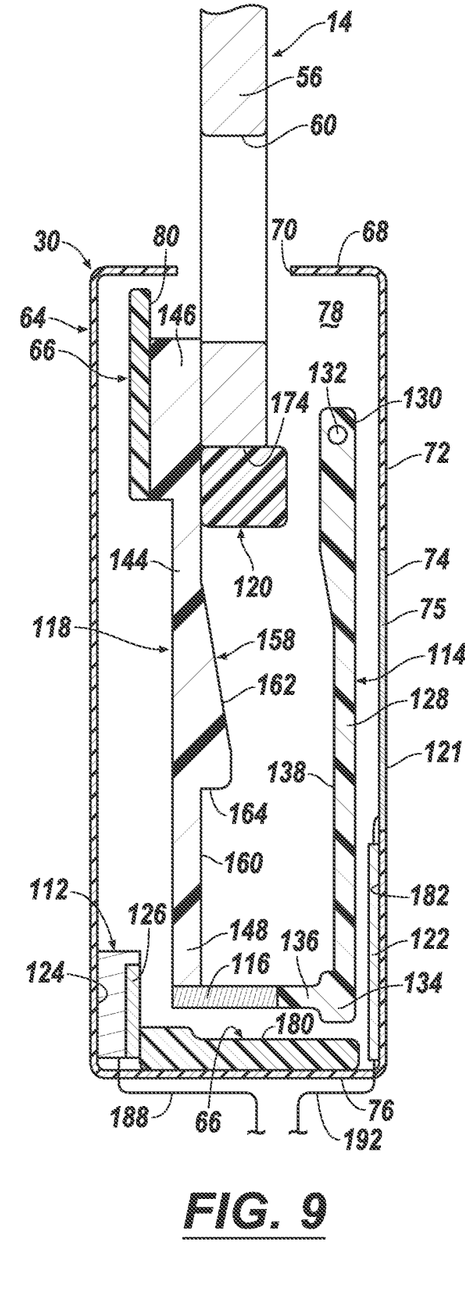
FIG. 9 is a sectional view of the seatbelt clip and seatbelt buckle in the uncoupled state.
Figure 10:
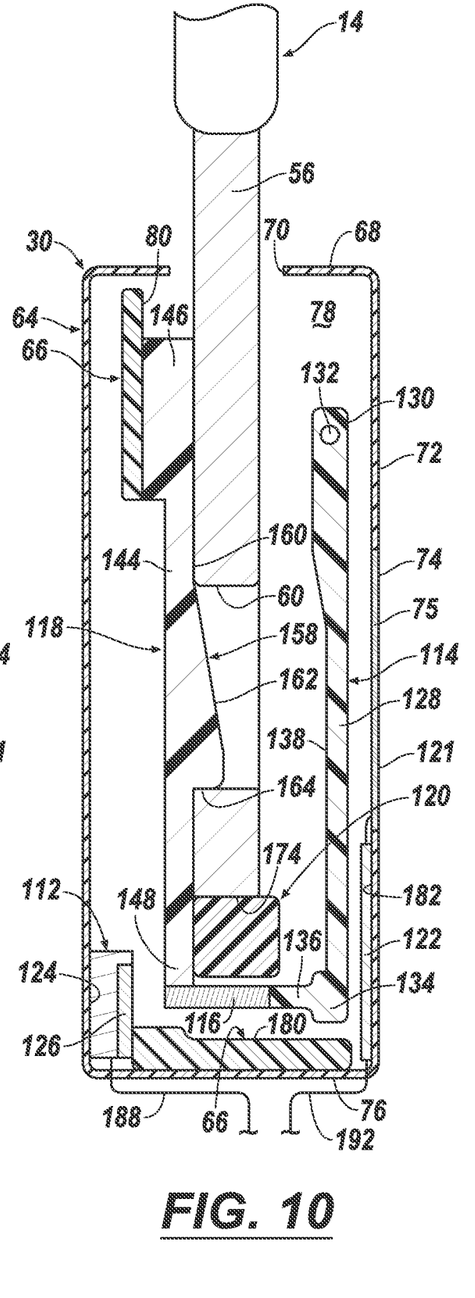
FIG. 10 is a sectional view of the seatbelt clip and seatbelt buckle in the coupled state.

Sensor 75 can be an electronic device adapted for touch, tactile, contact, or proximity sensing and may be located at least partially within the opening 74 of the major side 72 of housing 64 (see also FIGS. 9-10). One non-limiting example of sensor 75 is a biometric sensor which is adapted to sense at least a portion of a human's fingerprint or fingerprint pattern by the user touching an outwardly-facing surface 121 thereof. In one implementation, the sensor 75 is coupled to a circuit card 122 located within housing 64 (e.g., see FIGS. 9-10)—and this card 122 may include a processor and electronic circuitry adapted to digitize sensor data and provide the sensor data to the computer 46. The circuit card 122 is not required, and other types of sensors are possible.

The attracting member 112 may be any device which, when electronically actuated by computer 46, attracts the attractable element 116. In at least one example, the attracting member 112 is an electro-magnet—e.g., a device that generates a magnetic field when electrical current passes therethrough, wherein the magnetic field disappears in the absence of electrical current. The attracting member 112 may be configured and/or arranged so that the magnetic field is directed toward the attractable element 116 and consequently attracts the element 116 toward the attracting member 112 when energized (e.g., creating a magnetic coupling wherein the member 112 and element 116 are attracted to one another). In one example, the attracting member 112 is coupled to an inner surface 124 of the housing 64 (e.g., near the second end 76 and opposite opening 74). In this manner, when the frame 66 is assembled into the housing 64, the attracting member 112 may be located between the housing 64 and the frame 66.

In at least one example, the attracting member 112 may include a magnetic core 126 (e.g., to shape or guide the magnetic field created by the attracting member 112). The core 126 may have any suitable shape and may be comprised of any suitable material having a relatively high magnetic permeability (e.g., a ferromagnetic metal). Here, the core 126 is shown at least slightly embedded within the attracting member 112; however, this is not required (e.g., it could be surface-mounted instead). When assembled, the attracting member 112 may be oriented so that the core 126 faces the frame 66. The core 126 is optional; thus, attracting member 112 implementations without the core 126 are also possible.

The actuator 114 is another component which may be located between the frame 66 and housing 64—e.g., between the frame 66 and the opening 74 on the major side 72. As used herein, the actuator 114 includes any component that includes the attractable element 116 and which is adapted to displace the lock 118 from the clip 14 in response to an electronic actuation of the attracting member 112. In one example, it includes an actuator plate 128 having a proximal end 130 coupled to the housing 64. In the illustrations, the proximal end 130 is pivotally coupled to housing 64 via a rod 132; however, this is not required. Nearer a free end 134 of the plate 128, a flange 136 may extend outwardly from a side 138 of the plate 128 which faces the frame 66. And at least a portion of the flange 136 may include the attractable element 116—which according to one non-limiting example is a magnetic core (having any suitable shape and being comprised of material similar or identical to the core described above). Core 116 may be suitably configured and/or arranged to be responsive to the magnetic field selectively generated by the energization of the attracting member 112. In one example, the flange 136 includes two terminal portions 140, 142 which carry the core 116, and the core 116 extends farther from the side 138 of plate 128 than the terminal portions 140, 142—e.g., see FIG. 8. The actuator plate 128 and flange 136 may be formed in a mold. For example, the plate 128 and flange 136 may be formed around the core 116 according to an insert molding process using any suitable material (e.g., any suitable non-ferromagnetic material (e.g., high-strength aluminum, plastic, etc.)).

In other examples, the proximal end 130 of actuator plate 128 could be fixed to the housing 64—and, e.g., the plate 128 could be comprised of a resilient material (e.g., plastic or the like). Thus, instead of pivoting via the rod 132, the actuator plate 128 could flex toward the attracting member 112 during electronic actuation (to an attracted position) and return to a nominal position when the attracting member 112 is not actuated. Thus, in either example, the free end 134 is uncoupled and permitted to move toward the attracting member 112.

The lock 118 may include a base plate 144 having a proximal end 146 that is thicker than the remainder of the base plate 144; in one example, the proximal end 146 may be fixed to the bottom 80 of frame 66 (nearer end when assembled). A free end 148 of the base plate 144 may include a notch 150 at a peripheral edge 152—and the notch 150 may be defined by two protruding portions 154, 156. The width of the notch 150 may be sufficiently large to permit at least a portion of the attractable element 116 to move between the protruding portions 154, 156 without interference.

A locking feature 158 of lock 118 may protrude from a side 160 of the base plate 144 (e.g., the feature 158 may face actuator 114). According to one non-limiting example, the feature 158 may be a ramp having a sloped surface 162 (nearer the proximal end 146) and an abutting surface 164 (facing the free end 148). As will be explained more below, when the clip 14 and buckle 30 are in a coupled state, the abutting surface 164 (of the lock 118) may be engaged with the abutting surface 62 (of the clip 14) while the lock 118 is in a nominal position. And, in releasing the clip 14 from the buckle 30, the base plate 144 may resiliently flex to a driven position (driven by actuator 114) and the sloped surface 162 of the locking feature 158 may facilitate ejecting the tongue 56 from the buckle 30.

In other lock examples, the proximal end 146 of the base plate 144 could pivot within the frame 66—e.g., the plate 144 being biased to the nominal position using a spring or the like (not shown) nearer the free end 148. Or in another example of lock 118' (shown in FIG. 7), which may be used singly or in combination with other examples discussed, the base plate 144' may include a magnetic core 166 as well (e.g., nearer the free end 148) to promote displacement from the nominal position to the driven position. Regardless of the arrangement, in at least one example, the locking feature 158 and base plate 144 may be formed together in a mold using any suitable non-ferromagnetic material (e.g., a plastic or the like). When the core 166 is included, an insert molding process may be used, as previously described.

The ejector mechanism 120 may be a component carried by the frame 66 for driving the tongue 56 of the clip 14 from the buckle 30. According to at least one example, it may include a C-shaped bracket 168 and a pair of springs 170. A leading edge 172 of the bracket 168 may be oriented within the frame 66 to abut an end surface 174 of the tongue 56 and the two trailing edges 176, 178 of the bracket 168 each may be coupled to ends of springs 170 (the opposite ends of which may be coupled to an inner surface 180 of the closed end 86 of frame 66). In this manner, the springs 170 may bias the bracket 168 toward the slotted opening 70 of the buckle housing 64—and the bracket 168 may slide within the track 99 of frame. The quantity and arrangement of springs 170, as well as the shape and orientation of the bracket 168, may differ in other examples. The bracket 168 and/or the springs 170 also may be comprised of any suitable non-ferromagnetic material (e.g., high-strength aluminum, plastic, etc.).

To assemble the buckle 30, the attracting member 112 may be mounted within the second end 76 of the housing 64 (as described above). Also the sensor 75 may be located within the housing 64 at the opening 74; similarly, the circuit card 122 (if used) may be located within the housing 64 as well (e.g., near an inner surface 182 of the major side 72 or the like). Thereafter, the proximal end 130 of the actuator plate 128 may be coupled to the housing 64 (e.g., nearer the first end 68 at or adjacent to the inner surface 182).

Before inserting the frame 66 into the housing 64, components may be assembled therewith. For example, the base plate 144 (of the lock 118) may be coupled to the bottom 80 of the frame 66; thereafter, the ejector mechanism 120 may be located in the frame 66 (coupling the springs 170 to the frame 66 and bracket 168, and locating the bracket 168 within the track 99). Next, using the slots 100, 102 (and/or any other suitable feature), the second webbing 38 may be secured to the frame 66. Thereafter, the frame 66 may be coupled within the housing 64 so that the open end of the frame 66 is nearest the slotted opening 70 of the housing 64, and the second webbing 38 extends from the second end 76 of the housing.

As discussed with respect to FIG. 1 above, the electronic seatbelt system 10 also may include one or more computers (e.g., such as a restraint control module (RCM) or the like). While multiple computers may be used to carry out the functions described below, a single computer 46 will be described for illustrative purposes only. Computer 46 may comprise a processor or processing circuit 184 coupled to memory 186. For example, processor 184 can be any type of device capable of processing electronic instructions, non-limiting examples including a microprocessor, a microcontroller or controller, an application specific integrated circuit (ASIC), etc.—just to name a few. Processor 184 may be dedicated to computer 46, or it may be shared with other vehicle systems and/or subsystems. In general, computer 46 may be programmed to execute digitally-stored instructions, which may be stored in memory 186, which enable the computer 46, among other things, to electronically actuate the attracting member in the buckle (e.g., energize the electromagnet), and (when applicable) to authenticate sensor data received from the sensor.

Memory 186 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 186 may store one or more computer program products which may be embodied as software, firmware, or the like.

Computer 46 is coupled to seatbelt buckles 30,32 via at least one connection. In FIG. 1, power connections 188,190 and communication connections 192, 194 are shown; however, this is merely exemplary. The connections 188-194 may be wired or wireless; further, they may be discrete connections and/or bus or network connections (e.g., controller area network (CAN) bus, Ethernet, Local Interconnect Network (LIN), etc.). In one non-limiting example, connections 188, 190 are used to actuate the respective attracting members (112) and connections 192, 194 are network connections (for communicating sensor data from respective sensors (75)).

During operation of the electronic seatbelt system 10, the clip 14 and buckle 30 first are in an uncoupled state (e.g., the clip 14 is not located within the buckle 30). Next, the clip 14 may be inserted into the seatbelt buckle 30—e.g., a user may manually slide the tongue 56 into the slotted opening 70 of the housing 64 (and into the frame 66) until the ramp 158 of the lock 118 is located within the opening 60 of the tongue 56. In one example, as the tongue 56 is driven against the ramp 158, the free end 148 of the base plate 144 moves toward the attracting member 112. Once the ramp 158 is within the tongue opening 60, the abutting surfaces 62, 164 (of the clip 14 and ramp 158, respectively) are located adjacent one another and the base plate 144 resiliently returns to the nominal position. The clip 14 and buckle 30 may remain in this coupled state until the computer 46 determines to electronically actuate the attracting member 112 and consequently release the clip 14.

The computer 46 may receive input(s) from other computers or devices to determine when to electronically actuate the attracting member 112. Or the computer 46 may determine without such inputs, as described in at least one non-limiting example below. Regardless, it should be appreciated that the actuation may be directed to one or more seatbelt buckles 30-36 in the vehicle 12. For example, any suitable number of buckles 30-36 may be energized so that the respective clips 14-20 are released to the uncoupled state, or certain clips may be released while others are not.

In one example, computer 46 receives sensor data from the buckle sensor 75 and determines to actuate the attracting member 112 based on this data. In one non-limiting example, a person may touch the sensor 75 with his/her finger, and the sensor 75 may provide an electronic output to the computer 46 that includes biometric data (e.g., via connection 192). The computer 46 may determine whether a fingerprint (or partial fingerprint) matches that of an authorized user—i.e., a user authorized to release the clip 14 from the buckle 30. If the computer 46 determines a match, the computer 46 may electronically actuate the attracting member 112. If the computer 46 determines that a match does not exist, the computer 46 may not perform the actuation. In one example, an authorized adult may have previously stored fingerprint or other identifying information in computer memory 186 via any suitable method (e.g., via a vehicle touchscreen, a mobile device, etc.). Thus, e.g., if a child touches the sensor 75 during the autonomous taxi example discussed above, the computer 46 may not determine a match.

The electronic actuation may cause a suitable electrical current to pass through the attracting member 112 (e.g., via connection 188), thereby energizing the attracting member 112 and generating a magnetic field. In response, the free end 134 of the actuator plate 128 may move toward the attracting member 112 (to the attracted position). More specifically, the magnetic field may be sufficiently strong to cause the flange 136 to contact and drive the free end 148 of the lock base plate 144 toward the attracting member 112—e.g., far enough so that the locking feature 158 (e.g., the ramp) is displaced from the opening 60 in the tongue 56 of clip 14 (i.e., at the driven position of the lock 118). This then permits the ejector mechanism 120 to drive the tongue 56 out of the buckle 30, as the ejector bracket 168 is biased toward the slotted opening 70 of the housing 64. In at least one example, the terminal portions 140, 142 of the flange 136 contact and drive the protruding portions 154, 156 of the (lock's) base plate 144 to move the free end 148 of base plate 144 to the driven position. (And in examples where core 166 is used, the core 166 further promotes movement of the free end 148 of the lock 118 toward the attracting member 112.) When the electrical current ceases, the base plate 144 of the lock 118 returns to its nominal position—no longer being driven by the actuator 114—and e.g., being biased to this position by the resiliency of the actuator 114, by a spring (not shown), by a combination thereof, etc. Similarly, the actuator plate 128 (if pivotally coupled) may simply return to its nominal position; or if the actuator plate 128 is fixed at its proximal end 130, it may return to its nominal position based on a resiliency thereof. In this uncoupled state, the buckle 30 is again ready to receive the clip 14 and repeat the operation.

Other examples of the computer 46 actuating the seatbelt buckle 30 include the computer 46 receiving a wireless message or instruction from a mobile device (not shown). For example, the computer 46 may receive a cellular communication or short range wireless communication (e.g., Bluetooth, BLE, Wi-Fi, etc.), or the like) indicating that an authorized user desires to release the clip 14 from the seatbelt buckle 30. Continuing with the autonomous taxi example, a parent may receive an indication that the taxi vehicle 12 has arrived at its destination; and in response, the parent may transmit to the computer 46—via the mobile device—an acknowledgement and a command to electronically actuate the buckle 30. Upon receiving such a command, the computer 46 may validate the authenticity of the command, and upon validation, electronically actuate the seatbelt buckle 30.

In one example, the computer 46 receives an actuation signal from a switch 196 in the vehicle 12 (e.g., on the instrument panel). This may be actuated by a driver of the vehicle 12—and may be used when the vehicle 12 is operating in an autonomous and/or non-autonomous mode.

In another example, an emergency switch 198 may be located on an exterior 200 of the vehicle 12 which, when depressed, causes the computer 46 to provide the electronic actuation. In an emergency situation, this switch 198 may be available to emergency personnel, and the computer 46 may actuate the attracting member 112 in response to the switch 198 being actuated and a determination that the vehicle 12 is stationary.

In another example, the computer 46 may receive an electrical input indicating that the vehicle airbags (not shown) have deployed and that the vehicle 12 is stationary. In response, the computer 46 may electronically actuate one or more (e.g., or all) seatbelt buckles 30-36 so that persons restrained by them may be able to egress the vehicle 12. These are merely example situations wherein the computer 46 may electronically actuate the seatbelt buckle(s); others exist.

Furthermore, other electronic seatbelt system 10 implementations also exist. For example, the system 10 further may include an auxiliary power source 202 (FIG. 1) that provides backup power to the system 10 in the event that primary vehicle power is unavailable. The power source 202 may be coupled to computer 46, or in other examples, it may be coupled to the seatbelt buckle(s) 30-36 directly.

Figure 11:
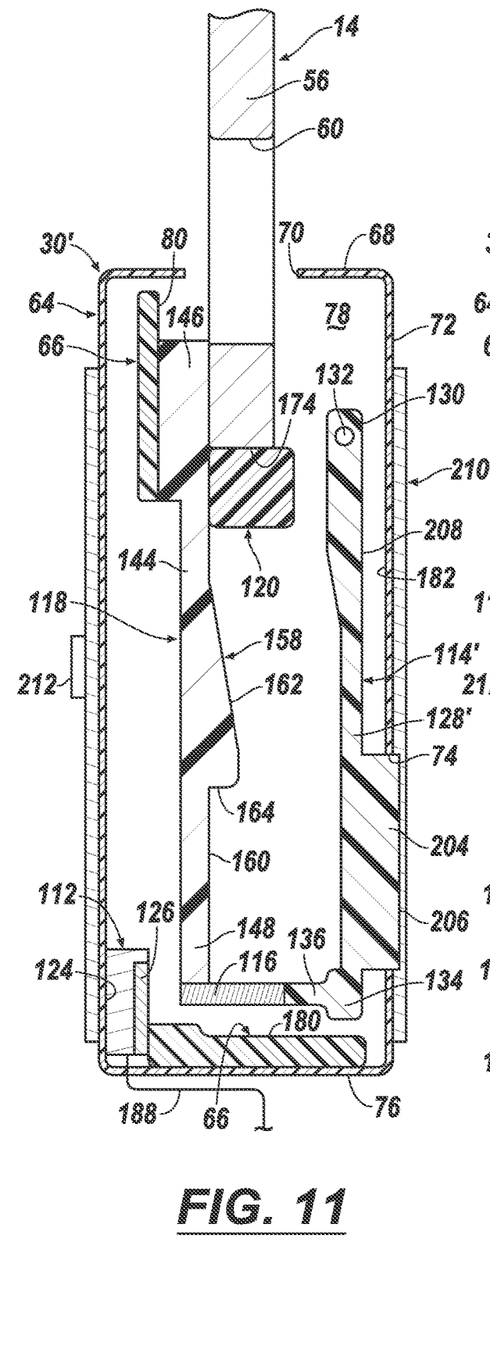
FIG. 11 is a sectional view of another example of a seatbelt buckle, the buckle and clip in an uncoupled state.
Figure 12:
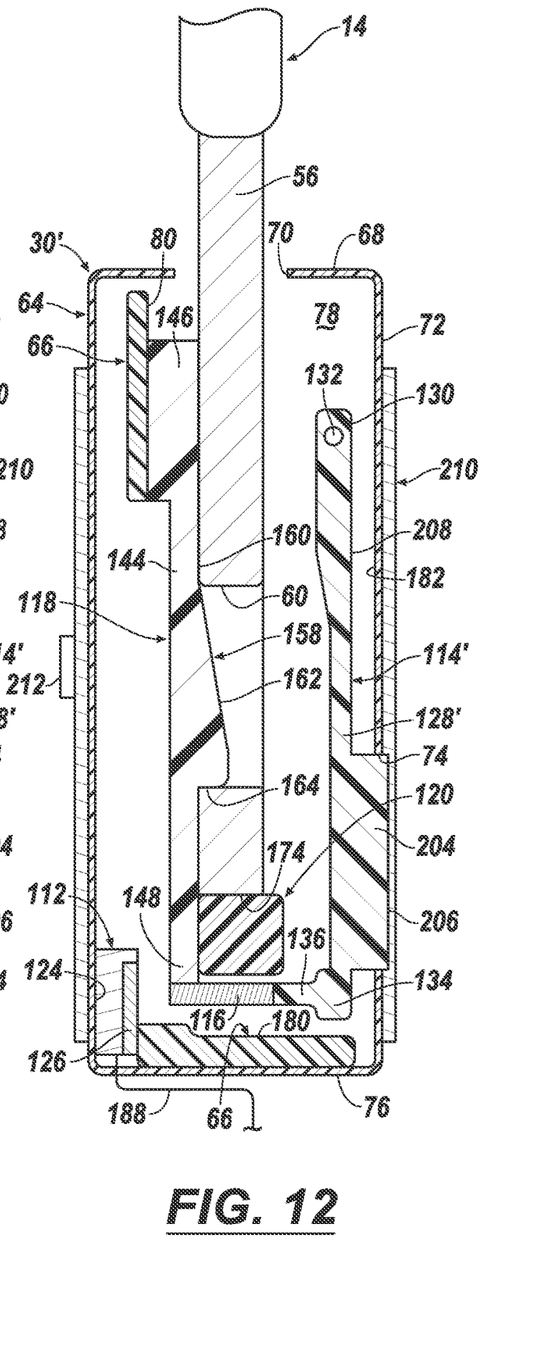
FIG. 12 is a sectional view of the buckle and clip of FIG. 11 in a coupled state.
Figure 13:
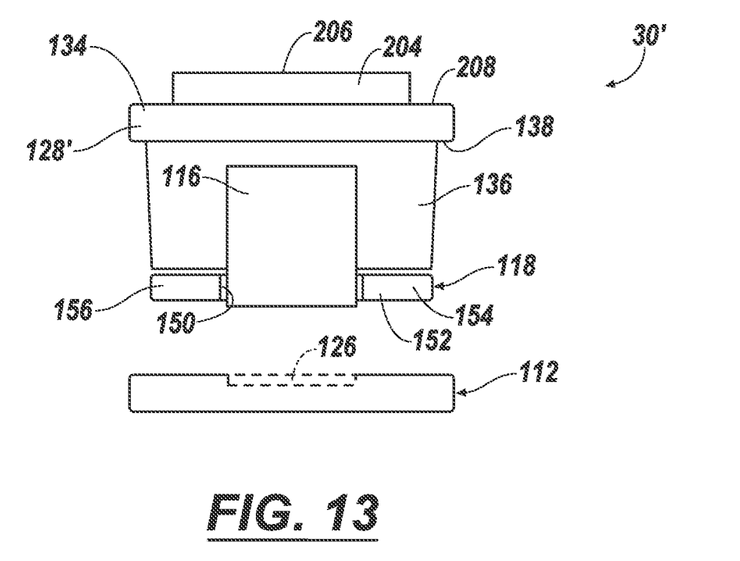
FIG. 13 is an end view of the seatbelt buckle of FIG. 11, wherein the housing, frame, and clip are hidden.

Different seatbelt buckle examples also exist. For example, FIGS. 11-13 illustrate a seatbelt buckle 30' that can release the seatbelt clip 14 via both manual or electronic actuation. Here, sensor 75 (and optional circuit card 122) are replaced by an actuation pushbutton 204 having a surface 206 that is formed as part of actuator 114'—e.g., the pushbutton 204 may be molded within the same piece of material as the actuator 114'. The pushbutton 204 may be a protrusion that extends from a major surface 208 of actuator plate 128'—the size and location thereof corresponding to the opening 74 in the housing 64. Thus, a user's finger(s) may depress the surface 206 causing the actuator 114' to drive the lock 118 to the driven position, and consequently the locking feature 158 may be driven from within the coupling feature 58 (of clip 14). Alternatively, the computer 46 may perform this operation electronically, as described in detail above.

An optional cover 210 which is configured to overlay the pushbutton 204 may be included which at least partially encloses the buckle 30' to inhibit a child or other person from actuating the pushbutton 204 when the cover 210 is installed. The cover 210 may include one or more suitable childproof locking features 212. In this manner, adults may use the buckle 30' (e.g., when the cover 210 is removed) or a child may be inhibited from depressing the pushbutton 204 (e.g., when the cover 210 is installed). Childproof locking features 212 are generally known and will not be described herein.

In other seatbelt buckle examples, the actuator 114 could carry an electromagnet and the attracting member 112 could carry a magnetic core. Here, the buckle would operate in a similar manner as that described above; e.g., the actuator 114 could still move toward the attracting member 112 thereby driving the lock 118 toward the member 112 and causing the clip 14 to be released.

In another seatbelt buckle example, the sensor 75 could be a tactile sensor. For example, when pressure greater than a predetermined threshold is applied to surface 121 of sensor 75, in one example, the sensor could send a message or electrical signal to computer 46 to trigger the electronic actuation of the seatbelt buckle 30. Or for example, the sensor 75 could provide a pressure measurement (e.g., via an electrical value) to the computer 46; and computer 46 could determine whether to electronically actuate the buckle 30 based on the measurement. In this example, the threshold may be associated with a strength and dexterity of the user to apply such pressure to the surface 121—e.g., a pressure threshold may be large enough that it can be presumed that most children could not apply it—thereby effectively childproofing the releasing of the clip 14 from the buckle 30.

Thus, there has been described an electronic seatbelt system that includes a seatbelt clip and a seatbelt buckle, the buckle having an attracting member and actuator that comprises an attractable element. The buckle may be configured so that when the attracting member is electronically actuated, the attractable element is drawn toward the attracting member thereby causing the actuator to drive a lock to release the clip.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. the processor can receive the data from the sensors and determine, from the data, [what the processor is supposed to do]. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A seatbelt buckle, comprising:
a housing having an opening;
an attracting member that generates a magnetic field;
an attractable element spaced and separate from the attracting member, the magnetic field generated by the attracting member being directed toward the attractable element;
an actuator that comprises an actuator plate coupled to a pushbutton; and
a base plate adapted to retain a seatbelt clip within the housing, wherein the attracting member, the attractable element, the actuator, and the base plate are carried by the housing;
wherein the seatbelt clip is released:
when the attracting member is electronically actuated and generates the magnetic field that attracts the attractable element, or
when the pushbutton is displaced inwardly with respect to the housing.

2. The seatbelt buckle of claim 1, wherein, when the attracting member is electronically actuated, the attractable element causes the base plate to move toward the attracting member and thereby release the seatbelt clip.

3. The seatbelt buckle of claim 2, wherein the actuator plate extends longitudinally along a first axis of the housing, wherein the base plate also extends along the first axis, wherein the base plate moves to release the clip along a second axis of the housing, wherein the second axis is transverse to the first axis.

4. The seatbelt buckle of claim 1, wherein, when an inwardly-directed force is applied to the pushbutton by a user of the seatbelt buckle, the actuator plate moves the base plate to thereby release the seatbelt clip.

5. The seatbelt buckle of claim 1, wherein the actuator further comprises a flange extending from the actuator plate, wherein the flange is coupled to and carries the attractable element.

6. The seatbelt buckle of claim 1, further comprising a cover that overlays at least the opening of the housing and inhibits pushbutton actuation by a user.

7. The seatbelt buckle of claim 1, wherein the attracting member is an electro-magnetic device.

8. The seatbelt buckle of claim 7, wherein the attracting member includes a magnetic core.

9. The seatbelt buckle of claim 1, wherein the attractable element is a magnetic core.

10. The seatbelt buckle of claim 1, wherein a locking feature protrudes from one side of the base plate to retain the seatbelt clip, wherein one end of the base plate is coupled to the housing, wherein, when the attracting member is actuated, the attractable element causes the actuator plate to resiliently flex and thereby release the seatbelt clip.

11. The seatbelt buckle of claim 1, wherein the base plate comprises a magnetic core responsive to the attracting member.

12. The seatbelt buckle of claim 1, wherein only one end of the actuator plate is coupled to the housing.

* * * * *